Figure 1:
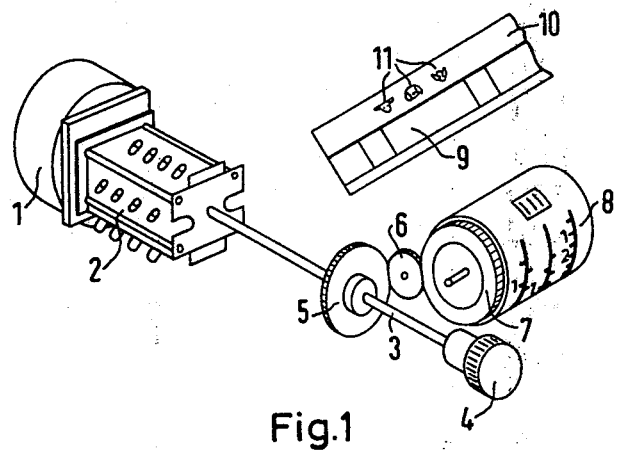

United States Patent

Schweig et al.

[11] 3,908,035
[45] Sept. 23, 1975

[54] METHOD OF ROASTING MEAT

[75] Inventors: Dieter Schweig; Sabine Schmiedel, both of Traunreut, Germany

[73] Assignee: Siemens Elektrogerate GmbH, Berlin, Germany

[22] Filed: Oct. 15, 1973

[21] Appl. No.: 406,287

Related U.S. Application Data

[63] Continuation-in-part of Ser. No. 142,685, May 12, 1971, abandoned.

[30] Foreign Application Priority Data

May 13, 1970 Germany............................ 2023242

[52] U.S. Cl. .................... 426/523; 426/233; 99/332
[51] Int. Cl.² ............................................ A23L 1/31
[58] Field of Search ...... 426/233, 243, 523; 99/328, 99/326, 327, 352, 397, 427, 447, 332

[56] References Cited
UNITED STATES PATENTS

| | | | |
|---|---|---|---|
| 2,839,409 | 6/1958 | Matleh................................ | 426/315 |
| 2,945,767 | 7/1960 | Phelan et al......................... | 426/243 |
| 3,827,345 | 8/1974 | Willson................................ | 99/327 |

*Primary Examiner*—Hyman Lord
*Attorney, Agent, or Firm*—Herbert L. Lerner

[57] ABSTRACT

Method for roasting meat in a cooking chamber includes the steps of precooking the meat at an ambient temperature within the range of 230°C to 270°C, and then finish-cooking the meat at a temperature within the range of 75°C to 90°C, the precooking and the finish cooking being effected, independently of the weight and type of meat and independently of whether the meat be frozen, fresh or defrosted, during respective time intervals of which the total constitutes a constant minimum preparation time within the range of 2½ to 5 hours.

A corresponding accessory apparatus for an oven includes a timing member for determining the time for switching the oven from the precooking condition to the finish cooking condition. An indicator having respective weight scales corresponding to different kinds of meat is coupled with a selector and the timing member for setting the latter to correspond to the weight and type of meat to be cooked.

4 Claims, 2 Drawing Figures

US Patent  Sept. 23, 1975  3,908,035

INVENTOR:

BY:

METHOD OF ROASTING MEAT

This application is a continuation-in-part application of our application Ser. No. 142,685, filed May 12, 1971 and now abandoned.

Our invention relates to a process and apparatus for roasting meat wherein the meat to be roasted is pre-roasted at a cooking temperature of over 200°C and subsequently cooked thereafter at a temperature below 100°C.

In known long-time cooking procedures, the total cooking time is dependent upon the weight, type of meat and the condition of the meat to be cooked so that before each cooking process, the cooking time and the time at which the cooking operation will begin measured from a time at which the roasting process will end must be determined. The cooking time determined from the known methods often amounts to 7 and more hours so that the application of a long-time cooking process is not possible when such long periods of time are not available.

Accordingly, it is an object of our invention to simplify the determination of the starting time for the end of a preselected cooking time. Subsidiary to this object it is an object of our invention to reduce the cooking time to a required minimum.

According to a feature of our invention a constant minimum cooking time is obtained which is put together from the precooking time and the finish cooking time. The constant minimum cooking time is independent of the weight, the type and condition of the meat to be cooked, that is, whether the meat is fresh, defrosted or frozen. Consideration is taken of the type, weight and the condition of the meat to be cooked because within the constant minimum cooking time the relation between the time for precooking and the time for finish cooking is changed.

Thus, it is also an object of our invention to povide a method for preparing meat within a constant minimum time which considers the factors of meat type, weight, and condition. Another object of the invention is to provide an apparatus for carrying out this method.

For this purpose an apparatus is especially suitable which has a timing member for determining the point in time for switching from the precooking to the finish cooking temperatures. And arranged with respect to such timing member is a selection apparatus and an indicating member wherewith the indicating member includes several weight scales referred to respective types of meat. It is especially advantageous and expeditious if the individual weight scales have a set of divisions for fresh or defrosted meat and a further division for the frozen meat.

It is a further feature of the invention to position the scales on a drum rotatably mounted behind a mask equipped with a viewing window. On the mask are placed respective symbols near the scales to relate the types of meat to the appropriate scales.

Other features which are considered as characteristic for the invention are set forth in the appended claims.

Although the invention is illustrated and described herein as method and apparatus for roasting meat, it is nevertheless not intended to be limited to the details shown, since various modifications may be made therein without departing from the spirit of the invention and within the scope and range of equivalents of the claims.

Figure 2:
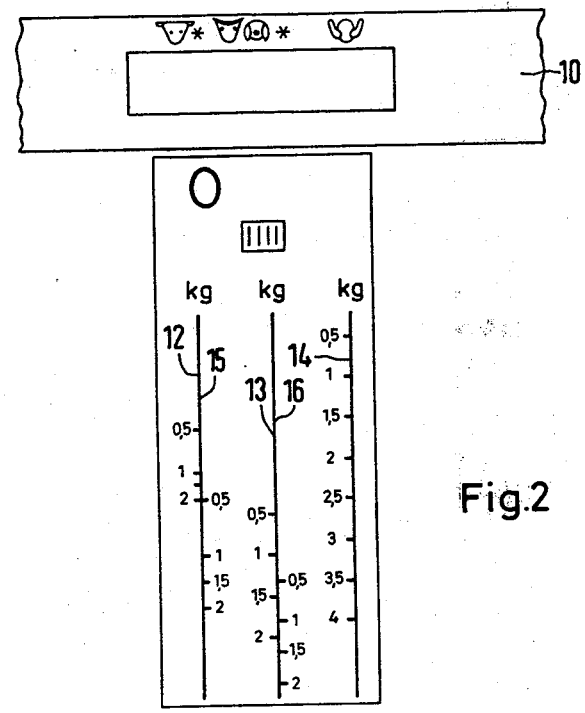

The invention, however, together with additional objects and advantages thereof, will be best understood from the following description when read in connection with the accompanying drawing, in which:

FIG. 1 is a perspective view of an accessory apparatus according to the invention; and FIG. 2 is a planar projection of the weight scales on the drum of the accessory apparatus according to FIG. 1.

The accessory apparatus according to FIG. 1 has a throw-over switch 2 controlled from a timing member 1 and is coupled through a shaft 3 with an adjusting button 4. On the shaft 3 is located a toothed wheel 5 which drives the drum 7 via another toothed wheel 6. On the outer surface of drum 7 there are several indicating scales 8. The drum 7 is disposed behind a viewing window 9 of the mask 10. Above the viewing window 9 are symbols 11 which correlate the different scales 8 to a definite meat variety.

FIG. 2 is a planar projection of the scales 8 on the drum 7. In this connection, the symbols 11 arranged on the mask 10 relate to the specific kind of meat and correspond to the divisions on the drum: divisions 12 correspond to veal, the divisions 13 correspond to beef and pork, and the divisions 14 correspond to fowl; these divisions each pertain to meat in the fresh or defrosted state. The divisions 15 and 16 arranged relative to divisions 12 and 13 respectively correspond to the pertinent meat in frozen condition.

With the assistance of the selection button 4, the weight of the meat to be roasted is located on the scale 8 wherewith the divisions corresponding to the previously mentioned meat types is controlling. Together with the scales 8, the timing member 1 is driven so as to be appropriately positioned. The switch-over from precooking to finish-cooking results in that the appertaining food can be taken from the cooking chamber of a conventional stove or oven, such as an electric oven preferably, in a ready-to-serve condition after a constant minimum preparation time. Of course, the food may also be cooked in a cooking chamber of a gas or infra-red heating oven or for that matter, a coal-heated oven or any suitable chamber heated by a fossil fuel or any other source of heat. It is possible, without affecting the meat quality, to leave the meat in the cooking chamber for a period longer than the minimum cooking time wherewith the finish-cooking temperature is maintained, that is, the food being cooked can, after several hours after the minimum cooking time has elapsed, be removed from the cooking chamber and served warm.

Especially good cooking results are obtained when the minimum cooking time is set to a value between 2 ½ and 5 hours, preferably 3 hours, wherewith the precooking temperature is between 230°C and 270°C, preferably 250°C, and the finish-cooking temperature is between 75°C and 90°C, preferably 82°C.

In the following table on the next page hereof, there are listed the precooking periods in minutes for 3 hours of total cooking time of various types of meats in either fresh or thawed or deep-frozen condition for various weights thereof ranging from 0.5 to 4.0 kg, where the precooking temperature is 250°C and the finish-cooking temperature is 82°C.

| Type of Meat | Precooking Periods (minutes) for 3 Hours of Total Cooking Time | | | | Poultry |
| --- | --- | --- | --- | --- | --- |
| | Veal | | Beef — Pork | | |
| Condition of Meat Meat Weight | Fresh or Thawed Minutes | Deep Forzen Minutes | Fresh or Thawed Minutes | Deep Frozen Minutes | Fresh or Thawed Minutes |
| 0.5 kg | 50 | 75 | 80 | 105 | 15 |
| 1.0 kg | 65 | 95 | 120 | 30 | 30 |
| 1.5 kg | 70 | 105 | 110 | 132 | 45 |
| 2.0 kg | 75 | 115 | 125 | 144 | 60 |
| 2.5 kg | | | | | 75 |
| 3.0 kg | | | | | 90 |
| 3.5 kg | | | | | 105 |
| 4.0 kg | | | | | 120 |

Precooking Temperature 250°C
Finish-cooking Temperature 82°C

Thus, for example, 0.5 kg of fresh veal was precooked at 250°C for 50 minutes in an electric oven. Since the total cooking time is 3 hours, the timing member 1 is set to 2 hours and 10 minutes for finish-cooking the precooked fresh veal at 82°C.

In another example, 2.0 kg of deep-frozen beef is precooked for 144 minutes at 250°C in an electric oven. Finish-cooking is thereafter carried out at 82°C for a period of 36 minutes to complete the total cooking time of 3 hours.

In yet another example, 4.0 kg of thawed poultry is precooked at 250°C for 120 minutes in an electric broiler. The poultry is finish-cooked in an electric broiler at 82°C for an additional hour.

We claim:

1. Method of roasting meat in a cooking chamber which comprises cooking the meat at different temperatures, independently of the weight and type of meat and independently of whether the meat is frozen, fresh or defrosted, during two successive time intervals the total of which constitutes a constant minimum preparation time interval having a preselected duration of from 2½ to 5 hours, the meat being precooked during the first of the time intervals at a given temperature within the range of 230°C to 270°C, and then finish-cooked during the second of the time intervals at a given temperature within the range of 75°C to 90°C, the precooking time interval being predetermined in accordance with the weight, type of meat and whether the meat is frozen, fresh or defrosted, the finish-cooking time interval being the difference between the total preselected constant minimum preparation time interval and the precooking time interval.

2. Method according to claim 1, said minimum preparation time being 3 hours.

3. Method according to claim 1, said precooking temperature being 250°C and said finish cooking temperature being 82°C.

4. Method according to claim 1, wherein said time interval for said precooking is within the range of 15 minutes to 144 minutes, dependent upon the type, weight and condition of the meat.

* * * * *